US 6,595,347 B2

(12) United States Patent
Prodel

(10) Patent No.: US 6,595,347 B2
(45) Date of Patent: Jul. 22, 2003

(54) INSTALLATION FOR THE CIRCULATION OF PART-CARRYING PALLETS AND A PALLET FOR SAID INSTALLATION

(75) Inventor: Jacques Prodel, deceased, late of Carlepont (FR), by Annik Prodel, executor

(73) Assignee: Prodel Holding, Carlepont (FR)

( * ) Notice: Subject to any disclaimer, the term of this patent is extended or adjusted under 35 U.S.C. 154(b) by 0 days.

(21) Appl. No.: 10/046,136

(22) Filed: Jan. 10, 2002

(65) Prior Publication Data

US 2002/0179410 A1 Dec. 5, 2002

(30) Foreign Application Priority Data

Jan. 15, 2001 (FR) .............................. 01 00471

(51) Int. Cl.⁷ .............................. B65G 29/00
(52) U.S. Cl. .................. 198/465.1; 198/465.3
(58) Field of Search .................. 198/465.1, 465.2, 198/465.3, 580; 104/226, 189

(56) References Cited

U.S. PATENT DOCUMENTS

| 4,619,205 A | | 10/1986 | Sticht | |
|---|---|---|---|---|
| 4,832,171 A | | 5/1989 | Prodel | |
| 4,917,226 A | * | 4/1990 | Blocker | 198/465.3 |
| 4,974,519 A | | 12/1990 | Miletto | |
| 5,222,587 A | | 6/1993 | Chevalier et al. | |
| 5,622,246 A | * | 4/1997 | Kubota | 198/465.2 X |
| 6,223,886 B1 | * | 5/2001 | Bonora et al. | 198/465.2 |

FOREIGN PATENT DOCUMENTS

| EP | 0 340 639 A1 | 11/1989 |
|---|---|---|
| EP | 0 514 241 A1 | 11/1992 |
| FR | 2 589 134 A1 | 4/1987 |
| FR | 2 597 450 A2 | 10/1987 |
| FR | 2 679 164 A1 | 1/1993 |
| GB | 2 270 290 A | 3/1994 |
| JP | 4-354709 | 12/1992 |

OTHER PUBLICATIONS

Search Report of Corresponding French Application No. 01/00471, dated Oct. 5, 2001.

* cited by examiner

Primary Examiner—James R. Bidwell
(74) Attorney, Agent, or Firm—Christie, Parker & Hale, LLP

(57) ABSTRACT

An installation comprises part-carrying pallets (10) of general rectangular shape which are displaced in elementary modules (46) under the frictional action of at least one drive run (50), displacement of the pallets being effected by way of rollers (32) provided on the pallet and rolling on the respective bottoms of the modules. The pallet (10) comprises a body (12) below which are mounted idler wheels (26) disposed horizontally to provide for guiding and/or driving of the pallet, each module (46) comprises at least one guide rail (62) defining a circulation path of selected shape and made of an elastically deformable material, in such a way that during the displacement of the pallet on a module the guide rail (62) exercises an elastic return force against at least one idler wheel (26) of the pallet in such a way as to urge at least one drive portion (18) of the pallet into elastic contact against the drive run of the module.

26 Claims, 6 Drawing Sheets

Figure 1:
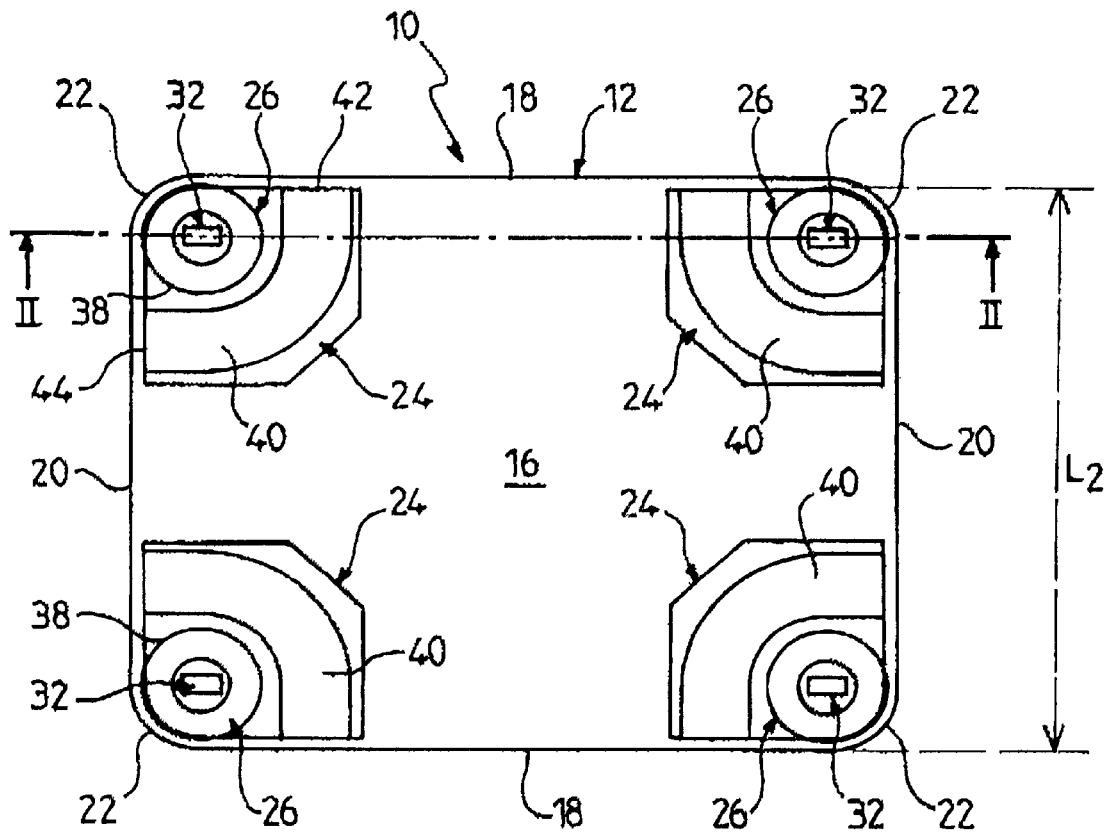

INSTALLATION FOR THE CIRCULATION OF PART-CARRYING PALLETS AND A PALLET FOR SAID INSTALLATION

CROSS-REFERENCE TO RELATE APPLICATION

This application claims priority of French Patent Application No. 01 00471, filed on Jan. 15, 2001.

The invention relates to installations for the circulation of part-carrying pallets.

It more particularly concerns an installation for the circulation of part-carrying pallets of a generally rectangular shape which are displaced in elementary modules under the frictional action of at least one drive run, displacement of the pallets being effected by way of rolling means fitted on the pallet and rolling on the respective bottoms of the modules.

Installations of that type, also referred to as 'flexible workshops', are already known, in which the modules can accommodate working stations and/or offer pure circulation functions.

Usually, each of the modules comprises at least one drive run such as for example an endless belt which provides for the displacement of a pallet in the interior of the module and from one module to another.

Those different modules define circulation paths of a selected shape, being generally straight or curved, possibly with a branch path.

Such installations make it possible to displace a pallet between different working stations in order to carry out a succession of operations, for example assembly and/or machining operations, on the parts which are carried by the pallets. Those installations thus make it possible to provide for the production of parts by a succession of operations which are implemented manually and/or automatically at the working stations.

A known installation of that type is described in French patent No 85 16095, published under the No 2 589 134. In that known installation, the pallets are driven by the co-operation of a drive run with a friction member forming part of the pallet and caused to bear under an elastic pressure against the run.

Such installations have been perfectly satisfactory hitherto, having regard to the relatively low speeds and levels of acceleration with which the pallets are involved.

However, with progress in robotics, the pallets are being displaced at ever increasing speeds, while also being subjected to ever increasing levels of acceleration.

Moreover, having regard to the ever increasing rates required for the production of parts, it is imperative that the pallets can be immobilised in a precise position at the location of a working station, more specifically with a very short time interval, in order then to be freed and continue their displacement towards other working stations.

It is necessary for the resumption of movement of the pallet under the effect of the drive run, at the end of immobilisation thereof, to be effected under optimum conditions in spite of the frictional factors involved.

It is imperative in particular that such resumption of movement does not give rise to acceleration effects, shocks nor vibrations, which are excessive and which would be likely to interfere with the movement of the pallet and/or cause displacement of the part or parts that the pallet is carrying.

Another problem which arises is that of ensuring entrainment of the pallets by frictional engagement with the drive run, immobilisation of the pallet while the drive run continues its movement, then resumption of the movement of the pallet under optimum operating conditions, all this in spite of the high speed of movement of the drive run.

The object of the present invention is precisely to provide an installation of that type, which makes it possible to afford circulation of the pallets under optimum operating and safety conditions, even at high speeds (typically of the order of several meters per second), as required by the current progress in robotics.

Another object of the invention is to provide such an installation in which the problems raised by circulation of the pallets at high speed, then immobilisation thereof and then resumption of the circulation thereof, are resolved in a simple and effective manner.

Yet another object of the invention is to afford such an installation in which immobilisation or indexing of a pallet which is in motion can be achieved without difficulty, even in the situation where the pallet is carrying a heavy load and is circulating at high speed.

A further object of the invention is to provide such an installation in which precise immobilisation of a pallet can be achieved by simple means, for the purposes of treating or processing the part or parts that the pallet is carrying.

The invention is applied to installations in which the modules provide for displacement on a circulation path of a selected shape, with or without maintenance of the spatial orientation of the pallet.

A further object of the invention is to provide a pallet suitable for being part of such an installation.

For that purpose the invention proposes an installation of the type defined hereinbefore, in which the pallet comprises a body below which are mounted idler wheels disposed horizontally to provide for guiding and/or driving of the pallet, in which each module comprises at least one guide rail defining a circulation path of selected shape and made of an elastically deformable material and in which during displacement of the pallet on the module the guide rail exercises an elastic return force against at least one idler wheel of the pallet in such a way as to urge at least one drive portion of the pallet into elastic contact against the drive run of the module.

The guide rail, by virtue of its elastic properties, exercises a spring function which urges the drive portion of the pallet against the drive run. That spring function of the guide rail can be reinforced or quite simply replaced by the addition of one or more mechanical flaps, which for example are spring-mounted, on the drive portion of the pallet to improve traction.

Thus, displacement of the pallet in a module or from one module to another is effected by frictional engagement of a drive portion of the pallet against a drive run, under the effect of an elastic return force exerted by a guide rail against at least one idler wheel of the pallet.

As will be seen hereinafter, those idler wheels which can also be referred to as rolling bearings contribute to guiding and driving of the pallet during the displacement thereof.

An important feature lies in the fact that the elastic return force which contributes to frictional engagement of the pallet with the drive run is ensured by the guide rail which accordingly ensures a combined guidance and elastic return function.

That therefore avoids having recourse to a specific friction member forming part of the pallet and caused to bear under elastic pressure against the run, as was the case in the installation in the above-mentioned French patent.

The installation of the invention may comprise different types of modules.

In particular, this may involve a module which defines a straight circulation path and which comprises a straight drive run, as well as a straight guide rail, which are in mutually parallel relationship, the drive portion of the pallet being formed by a side of the pallet while the idler wheel or wheels of the pallet which bear against the straight guide rail is or are disposed in the proximity of an opposite side of the pallet.

Thus, in that case, the drive portion of the pallet is formed by a side thereof.

The module may also define a curved circulation path and may comprise a curved drive run and a curved guide rail, which are disposed at a constant spacing, the drive portion of the pallet being formed by a first region of at least one idler wheel of the pallet which has a second region disposed in opposite relationship to the first region and bearing against the guide rail in the form of a circular arc.

In that case, drive and guidance for the pallet are afforded by at least one idler wheel which is urged into a condition of bearing against the drive run by way of the guide rail.

The module may also define a straight main circulation path having a straight main drive run, a straight secondary circulation path having a straight secondary drive run, with the main paths and secondary paths forming a right-angled branching. In that case the module is fitted with a diversion or direction-changing roller (advantageously being a drive roller), with a vertical axis, which is displaceable vertically between a low position in which it disappears into the bottom of the module for the pallet to be displaced along the main path, and a high position in which it projects above the bottom of the module in order to engage into a curved guide groove provided in one of the corners of the pallet in such a way that the pallet leaves the main circulation path, coming out of contact with the main drive run, to engage into the secondary circulation path and come into contact with the secondary drive run, without a modification in the spatial orientation of the pallet.

The diversion roller may also be accompanied by another member for facilitating movement in a straight line, for example another roller which can be raised in alternate relationship with the diversion roller.

The invention also provides indexing means for immobilising the pallet at a selected location on the circulation path, such means comprising two thrust members capable of being actuated by way of a sensor to apply a lateral force to two idler wheels of the pallet, on the opposite side to the drive run, cause disengagement of the drive portion of the pallet from the drive run, preferably without altering the linear speed thereof, and thus arrest the pallet.

Those indexing means may also comprise a retractable damper capable of being actuated with the thrust members to co-operate with an abutment of the pallet.

In another aspect the invention concerns a pellet capable of being used in an installation as defined hereinbefore.

Figure 2:
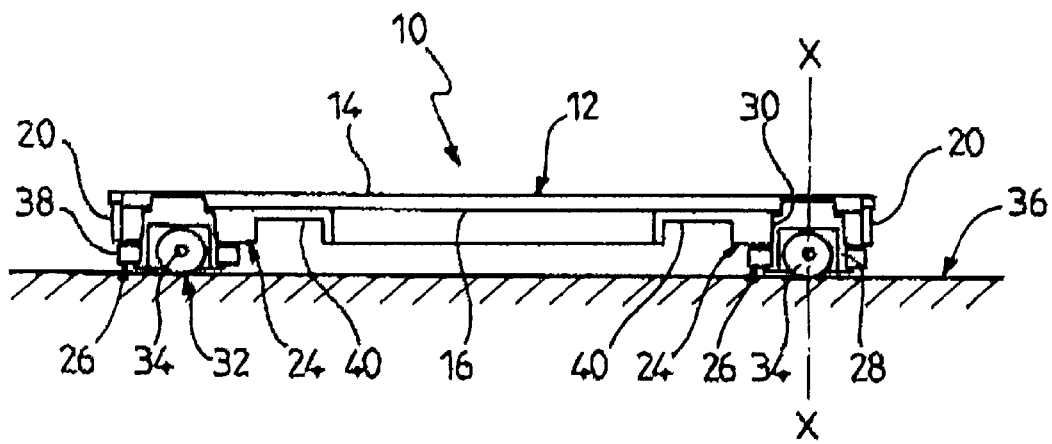
Figure 3:
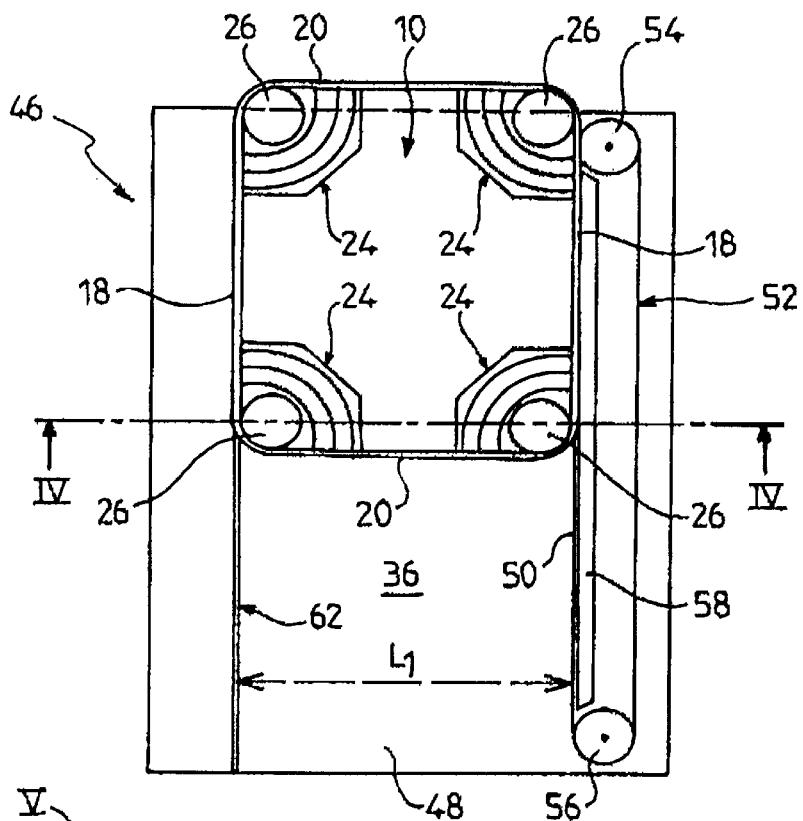
Figure 4:
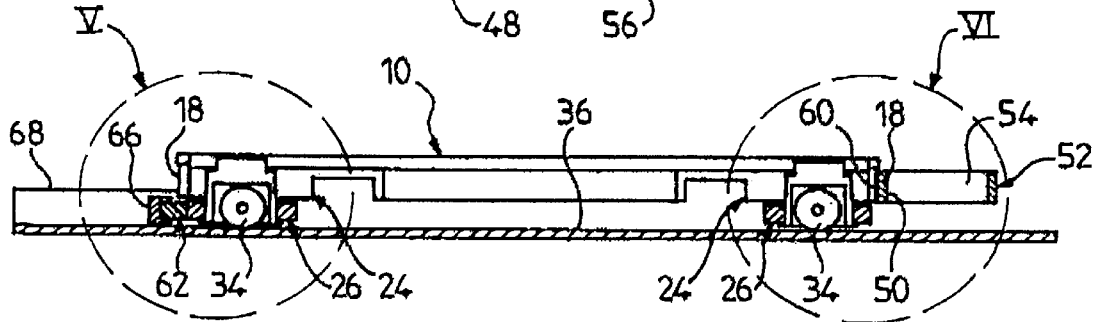
Figure 5:
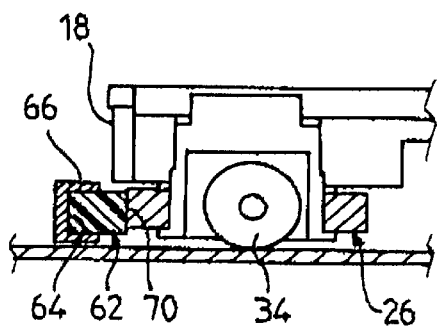
Figure 6:
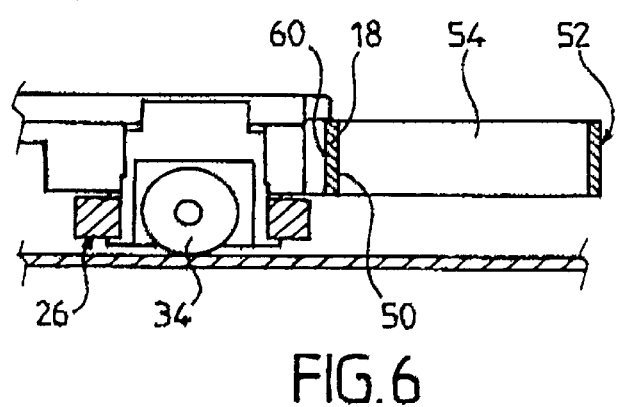
Figure 7:
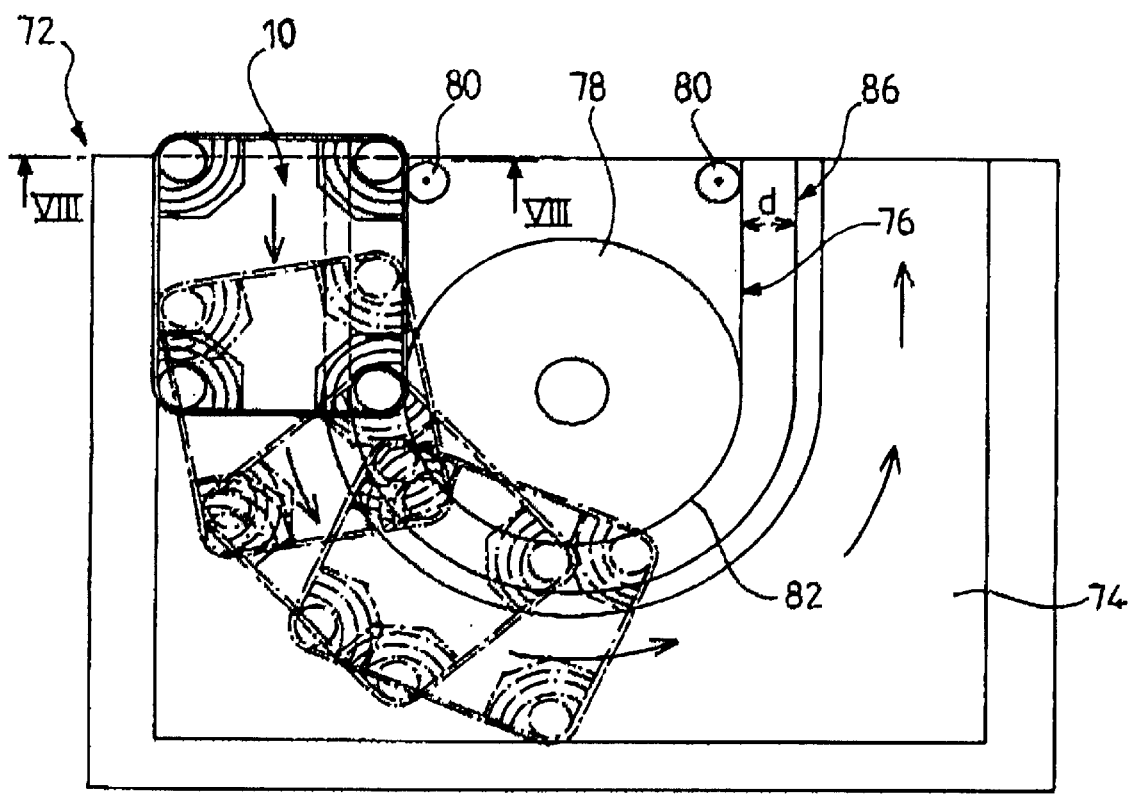
Figure 8:
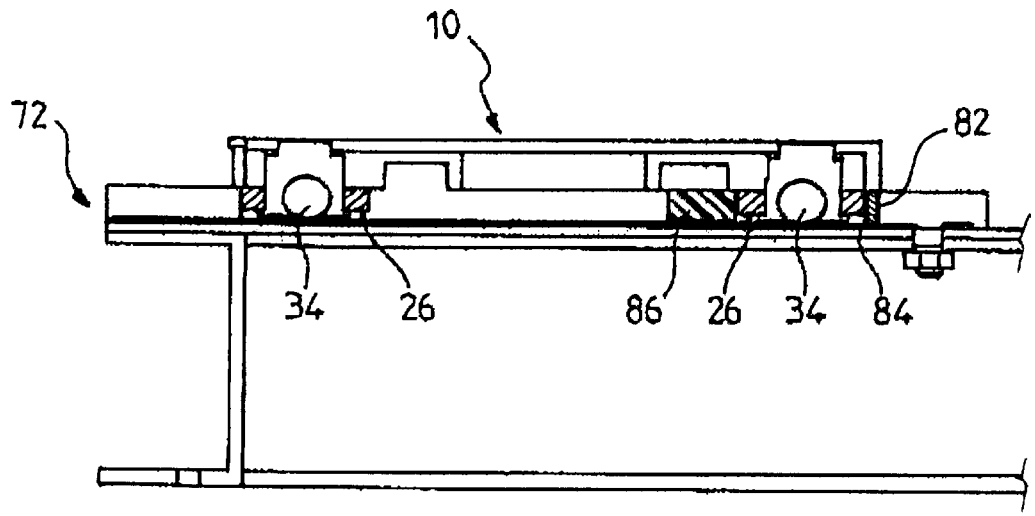
Figure 9:
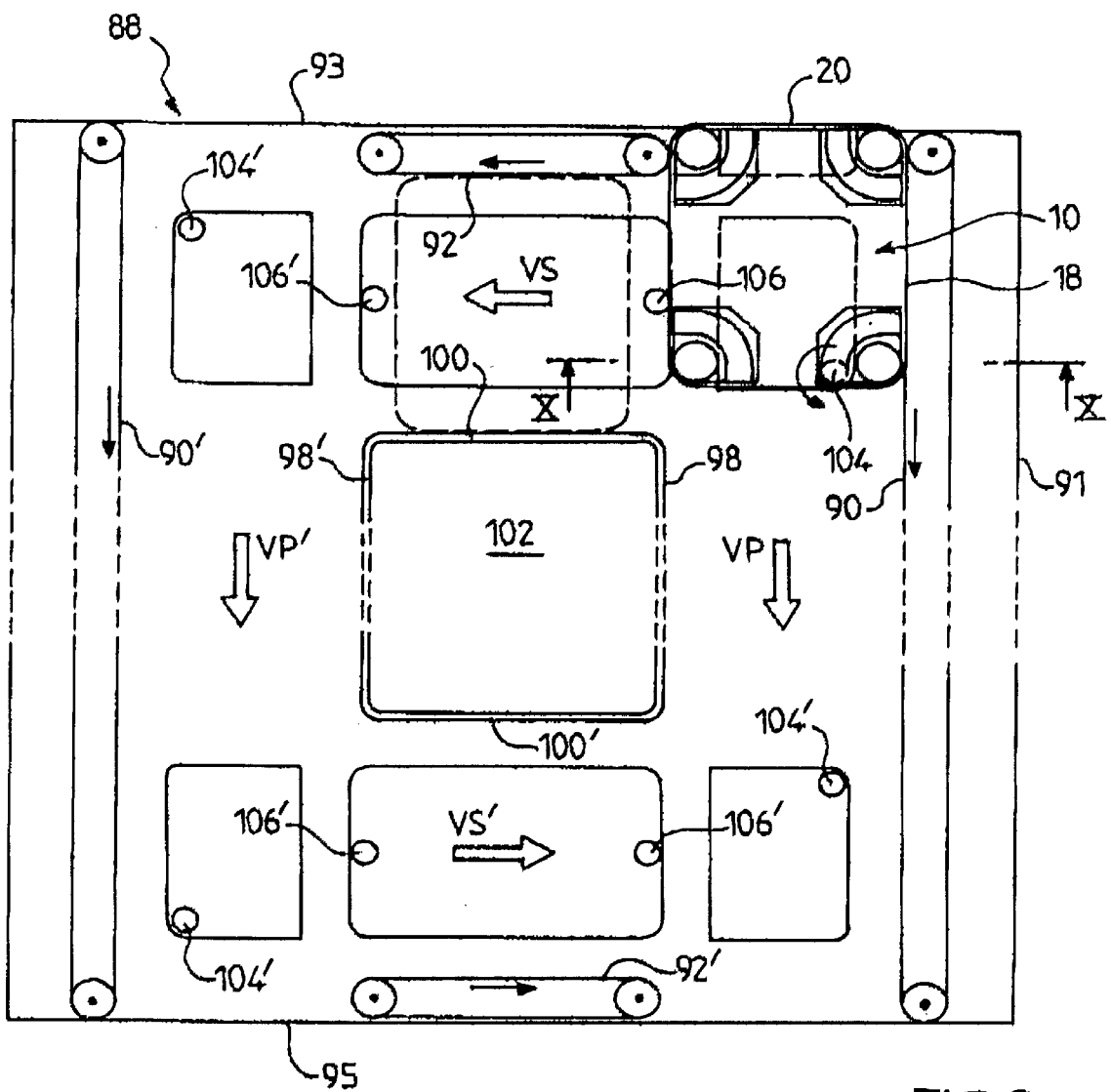
Figure 10:
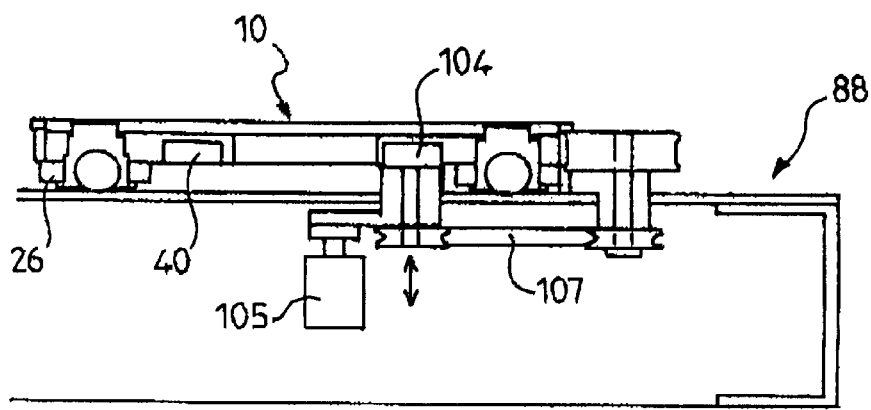
Figure 11:
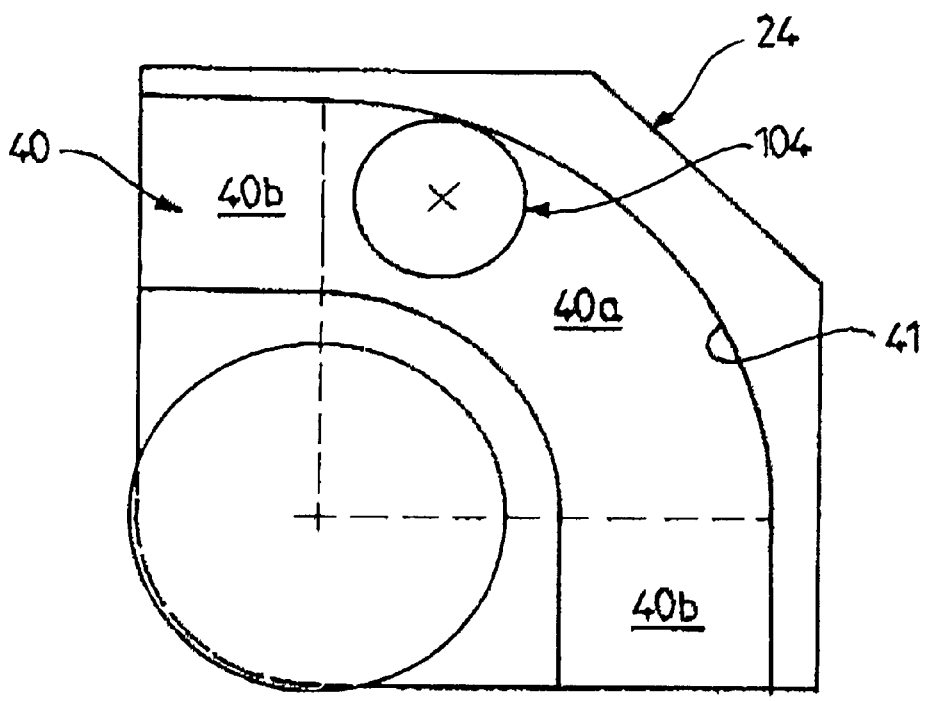
Figure 12:
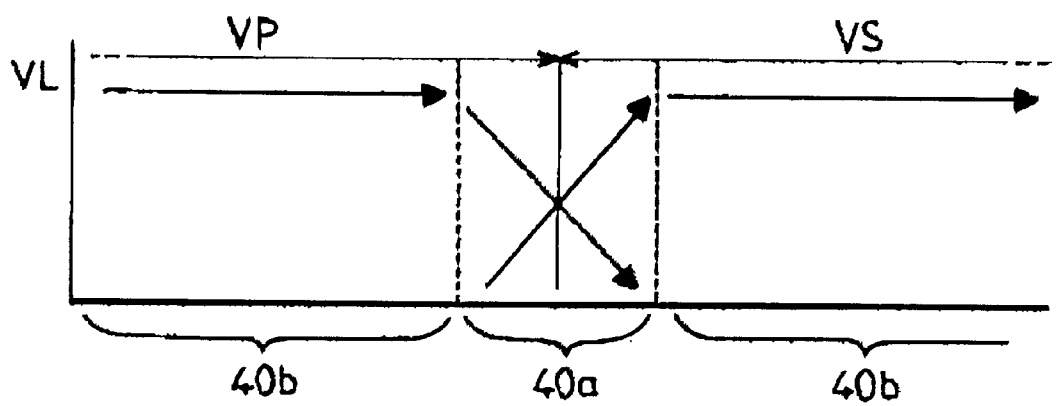
Figure 13:
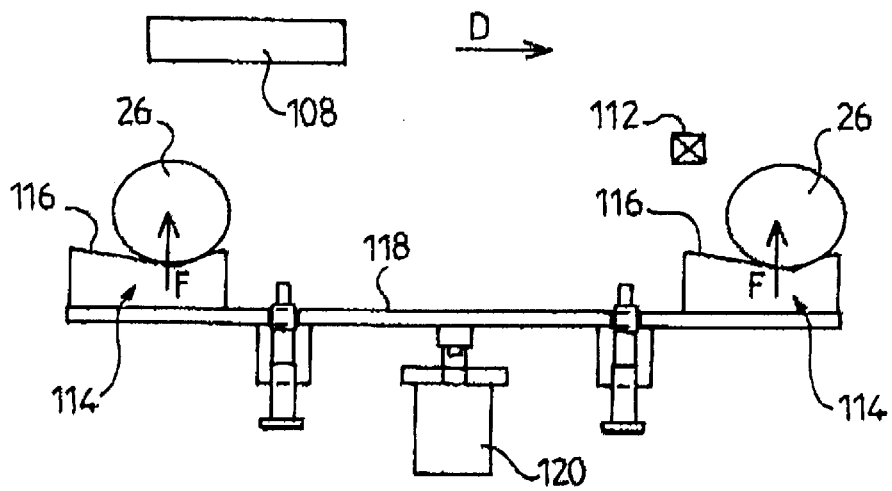
Figure 14:
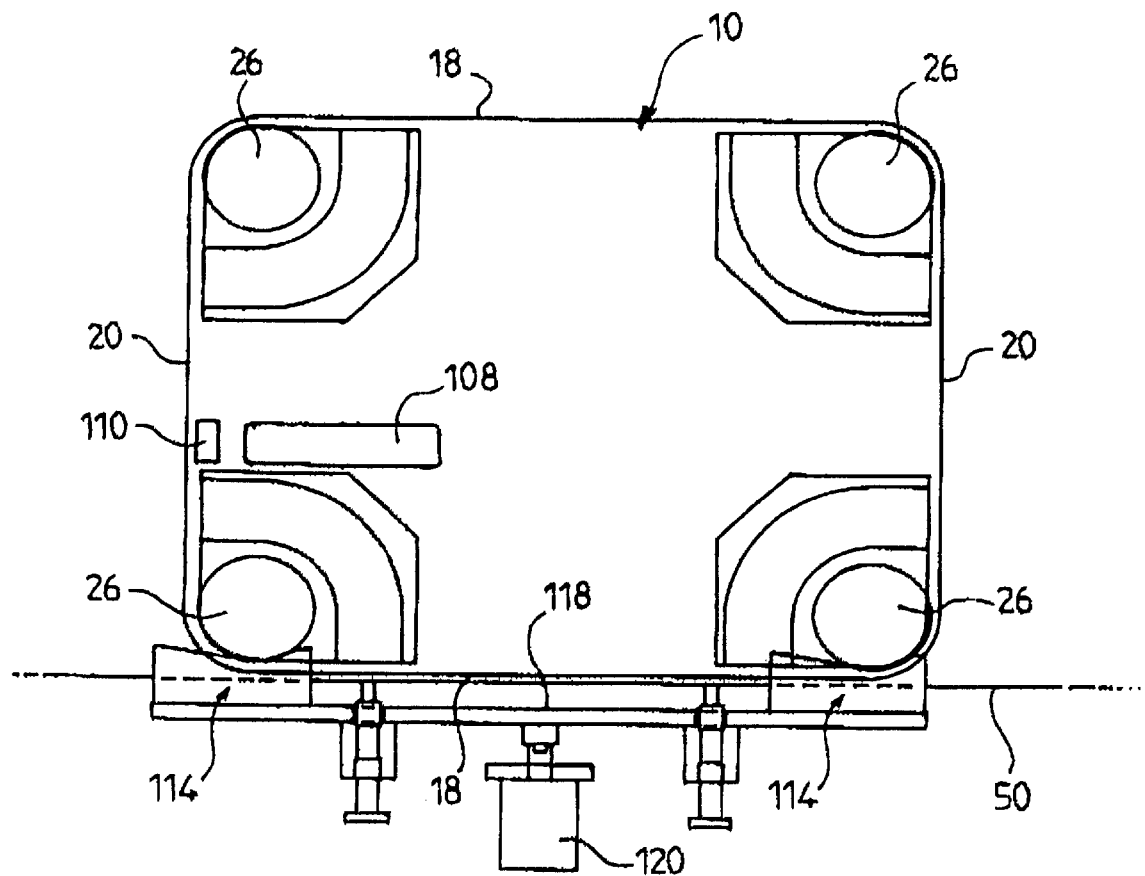

In the description hereinafter which is set forth solely by way of example reference is made to the accompanying drawings in which:

FIG. 1 is a view from below of a pallet capable of being part of an installation according to the invention, FIG. 2 is a view in section taken along line II—II in FIG. 1, FIG. 3 is a view from above of a module with a straight circulation path which can be part of an installation according to the invention, FIG. 4 is a view in section on an enlarged scale taken along line IV—IV in FIG. 3, FIG. 5 is a view on an enlarged scale of the detail indicated at V in FIG. 4, FIG. 6 is a view on an enlarged scale of the detail indicated at VI in FIG. 4, FIG. 7 is a view from above of a module with a curved circulation path which is capable of being part of an installation according to the invention, FIG. 8 is a view in section on an enlarged scale taken along line VIII—VIII in FIG. 7, FIG. 9 is a partial view from above of a module with perpendicular circulation paths, FIG. 10 is a partial view in section on an enlarged scale taken along line X—X in FIG. 9, FIG. 11 shows the co-operation of a guide groove of a pallet with a diversion roller, FIG. 12 is a graph showing the variations in the linear speed of a pallet in dependence on the position of the diversion roller in the guide groove upon a change in direction of a pallet, FIG. 13 is a view from above of indexing means capable of immobilising a pallet, and FIG. 14 is a view from above of a pallet immobilised by the indexing means of FIG. 13.

Reference will firstly be made to FIGS. 1 and 2 to describe a pallet 10 capable of being part of an installation according to the invention. The pallet 10 comprises a body 12 of general rectangular shape having an upper face 14 on which can be deposited at least one part (not shown) to be assembled or machined, and a lower face 16. The pallet is intended to be displaced horizontally or substantially horizontally. The body 12 of the pallet is delimited laterally by two edges or sides 18 extending in the longitudinal direction and two other sides or edges 20 extending in the transverse direction, the sides 18 being longer than the sides 20, in the illustrated example, it being noted that it is possible to envisage square pallets.

As can be seen from FIG. 2 the pallet comprises four rounded angles or corners 22 which connect the sides 18 and 20 in twos. The sides 18 and 20 and the rounded angles 22 of the pallet afford a continuous edge configuration extending perpendicularly to the faces 14 and 16 of the body 12.

Under its lower face 16 the body 12 comprises four blocks 24 (also referred to as 'raised slab portions') which are provided respectively in the regions of the four corners or angles 22. The blocks 22 are mounted to the body of the pallet or are formed integrally therewith.

The pallet 10 is equipped with four idler wheels 26 disposed horizontally and intended to provide for guiding and/or driving of the pallet, as will be seen hereinafter.

The idler wheels 26 are each carried by one of the blocks 24 disposed under the body 12 of the pallet. Each of the idler wheels 26 is mounted freely rotatably about an axis X—X which extends perpendicularly to the faces 14 and 16 of the pallet. Each of the idler wheels is in the form of a ring mounted on a rolling bearing, in particular on a ball-type rolling bearing (not shown), and carried by a cylindrical shaft or post member 28 engaged in a housing 30 in the corresponding block 24. Accommodated in the interior of each of the idler wheels in the form of a ring, that is to say here in the interior of each shaft or post member 28, is a rolling means 32. In the illustrated embodiment the rolling means 32 is a self-steering roller mounted freely rotatably about a horizontal axis 34 which is carried by a pivot (not shown) with an axis X—X which does not intersect the axis 34. Each of the self-steering rollers projects below the corresponding shaft or post member 28 to constitute a rolling means for providing for displacement of the pallet on a bottom 36 of a module (not shown).

As can be seen from FIGS. 1 and 2 each of the idler wheels 26 comprises a cylindrical contact surface 38 which is slightly set back with respect to the edges of the pallet as are formed by the sides 18 and 20 and the rounded angles 22.

In addition, provided in the lower face of each block 24 is a curved guide groove 40 which is substantially in the form of a circular arc and which opens at two edges 42 and 44 of the block, at the location of the sides 18 and 20 of the body of the pallet respectively. The structure and function of the guide grooves 40 will be described in greater detail hereinafter.

Reference will now be made to FIG. 3 showing an elementary module 46 which is suitable for being part of an installation according to the invention. The module 46 is intended to be carried horizontally by a frame or supporting framework (not shown) and thus constitutes one of the sections of the installation, in which respect it will be appreciated that this module is to be connected to other modules which are identical or different and which form part of the installation to constitute circulation paths for the pallets and/or to accommodate working stations.

In the illustrated example the module 46 defines a straight circulation path and it comprises a frame 48 carrying a bottom or floor 36 intended to be positioned horizontally or substantially horizontally. Pallets 10 as described hereinbefore can roll on the bottom 36, being displaced by way of their rolling means 32.

The module 46 comprises a straight entrainment or drive run 50 forming part of an endless belt 52 which passes around two guide pulleys 54 and 56 of which one at least is driven in rotation by a suitable motor (not shown). The drive run 50 bears by way of its inward face against a support rail 58.

As can be seen from FIG. 4 and from the detail in FIG. 6 the belt is a belt of flat section, in such a way that the drive run 50 affords a generally flat and vertical contact face 60 against which a frictional portion of the pallet can come to bear in elastic relationship. In the case of the module in FIG. 3 it is one of the sides 18 of the body of the pallet, which comes into frictional engagement against the contact face 60 of the run 50. The endless belt 52 is made of a material which affords a sufficiently high coefficient of friction with the material of the drive portion of the pallet. For that purpose, it is possible to use a material of polyurethane or rubber type for the belt.

The module 46 further comprises a straight guide rail 62 which extends parallel to the drive run 50. The guide rail 62 is made of an elastic material capable of providing an elastic return force of the desired value. For that purpose, the preference is to use an elastic material of polyurethane or rubber type, in particular of a hardness of between 35 and 40 Shore. In the illustrated example the elastic guide rail 62 is a removable band which is a force fit in a U-shaped groove 64 defined by a profile member 66 which forms part of an external edge 68 of the module 46 (FIGS. 4 and 5).

In the illustrated example the removable band is of a cross-section of generally rectangular shape, but it could be of another shape, for example semicircular. It has a substantially vertical contact face 70 which is arranged in such a way as to be urged in elastic contact against two of the idler wheels of the pallet, the other two idler wheels being disposed at the side where the drive run 50 is disposed.

The contact face 70 of the elastic guide rail 62 and the contact face 60 of the drive run 50 define between them, in the rest condition, a space of a value L1 which is less than the space L2 (FIG. 1) defined between the outside of the idler wheels disposed close to one of the sides 18 of the pallet body, on the one hand, and the opposite side 18, on the other hand.

The result of this is that the pallet has to be set in position by the application of force, in such a way that one of its sides 18 comes to bear against the contact face 60 of the run 50 while the idler wheels 26 which are disposed close to the other side 18 can engage against the contact face 70 of the elastic guide rail.

Under those conditions the elastic guide rail transmits an elastic return force which urges one of the sides 18 of the pallet against the drive run 50.

As a result the friction action of the drive run is produced under extremely simple conditions, against one of the sides of the pallet body, by way of the elastic return force produced by the guide rail.

It is to be noted that this rail is produced simply from a band which can be cut to the desired length and which can be easily set in position and replaced by hand in the event of wear, without requiring the use of tools.

In an alternative design configuration (not shown), the elastic return function (or spring function) of the guide rail 62 can be reinforced or quite simply replaced by the addition of one or more mechanical flaps or plate members on the drive portion of the pallet, which makes it possible to improve traction.

The traction flaps are thus advantageously mounted on a side 18 of the body of the pallet, with the interposition of a spring.

Reference will now be made to FIGS. 7 and 8 showing an elementary module 72 defining a curved circulation path. In the example illustrated the module 72 defines a U-shaped path forming a return configuration, and is intended to be positioned between two modules (not shown) disposed on respective sides of the line which is defined by the installation. The module 72 comprises a floor or bottom 74 which is also intended to be positioned horizontally or substantially horizontally. A pallet can thus be displaced along a U-shaped path of movement, as represented by the arrows.

The module 72 comprises an endless drive belt 76 which passes around a horizontal wheel 78 of large diameter, and around two guide pulleys 80. The wheel and/or one at least of the pulleys is driven in rotation by a suitable motor (not shown). The belt 76 is made in a similar manner to the belt 52 of the module 46 described hereinbefore. It defines a curved drive run 82 which comprises a portion in the form of a circular arc (semicircular portion) and two mutually parallel parts. The drive run 82 provides a generally flat and vertical contact face 84 (FIG. 8), against which a drive portion of the pallet is intended to come to bear.

The module 72 further comprises an elastic guide rail 86 of a curved shape and having a semicircular portion and two straight sections, in such a way that the drive run 82 and the guide rail 86 are disposed at a constant distance d from each other. The elastic rail is made in a similar manner to the rail described hereinbefore and is preferably of rectangular section. It is also engaged in a U-shaped groove (not shown). In the rest position the distance d is less than the diameter of the idler wheels 26 of the pallet. Thus, two of the idler wheels of the pallet which are disposed close to one of the sides 18 are engaged between the drive run 82 and the guide rail 86. The result of this is that the drive portion of the pallet is formed by a first region of each of the idler wheels and that the latter also have a second region which is disposed in opposite relationship to the first region and which comes to bear against the curved guide rail 86.

In other words the two idler wheels described hereinbefore are disposed in a sandwich relationship between the drive run 82 and the elastic guide rail 86.

Thus, in the case of the module 72, the preceding two idler wheels serve both for guiding and driving the pallet, the side 18 here having no function in terms of driving the pallet.

This means that the drive run 76 is to be disposed closer to the floor or bottom 74 of the module 72 than the drive run 50 with respect to the floor or bottom 36 of the module 46. The passage of a pallet from a module with a straight circulation path towards a module with a curved circulation path, or vice-versa, is effected smoothly and without jolts. It is to be noted that the respective drive belts of the modules which are driven by separate motors can impart different speeds to the pallet. In particular, the pallet may be caused to move at a higher linear speed in a module with a straight circulation path than in a module with a curved circulation path.

Reference will now be made to FIGS. 9 and 10 showing an elementary module 88 defining a straight main circulation path VP, a straight secondary circulation path VS and another straight main circulation path VP' which is parallel to the path VP. That last path is followed by a path VS' which is parallel to the path VS and joins the path VP at a right angle.

The main path VP comprises a straight main drive run 90 which extends parallel to an external edge 91 of the module while the secondary path VS comprises a straight secondary drive run 92 which extends parallel to an entry edge 93 of the module, in such a way that the runs 90 and 92 extend in mutually perpendicular relationship. Those runs form part of two different belts which are driven at the same linear speed in the direction indicated by the arrows, preferably by the same motor (not shown). As for the modules described hereinbefore, each of those belts is of a flat section and affords a flat external face for driving a pallet.

It will be appreciated that the main and secondary paths VP and VS define a right-angled branching and that the pallet 10 is intended either to be displaced in the direction of the main path VP or to be displaced in the direction of the secondary path VS, depending on the desired conditions. The main path VP comprises an elastic guide rail 98 which is disposed parallel to the main run 90 and which is connected in perpendicular relationship to an elastic guide rail 100 which forms part of the secondary path VS and which extends parallel to the secondary run 92.

This arrangement provides that the pallet can be displaced either on the main path VP by co-operating with the drive run 90 and the guide rail 98, or on the secondary path VS by co-operating with the secondary run 92 and the guide rail 100, without a change in the spatial orientation of the pallet. Thus, for the pallet to be driven on the main path VP, it is one of the sides 18 of the pallet which co-operates with the run 90 while, for being driven on the secondary path VS, it is one of the sides 20 of the pallet which co-operates with the drive run 92. The rail 100 is connected to an elastic guide rail 98' which is parallel to the rail 98 and which is also connected to an elastic guide rail 100' which is parallel to the rail 100. Those four rails are preferably of rectangular section and they surround a central frame 102 of rectangular shape and thus contribute to defining the paths VP, VP', VS and VS'. The path VP' comprises a drive run 90' parallel to the drive run 90 and the path VS' comprises a drive run 92' parallel to the drive run 92.

To permit the pallet which arrives on the module 88 to be switched as desired on to the main path VP or on to the secondary path VS, the module is equipped with a diversion roller 104 having a vertical axis, which is displaceable vertically, under the action of a ram or jack 105 (FIG. 5) between a low position in which the roller is retracted into the bottom of the module and a high position in which the roller projects above the bottom of the module.

In the low position the diversion roller is inactive, with the result that the pallet is switched in the direction of the main path VP.

In contrast, when the roller 104 is in the high position, it comes into engagement in one of the curved grooves 40 of the pallet (see FIGS. 1 and 2) in such a way that the pallet leaves the main path VP, coming out of contact with the main run 90, to engage into the secondary path VS and to come into contact with the secondary run 92 without a change in the spatial orientation of the pallet. In the example illustrated the roller 104 is motor-driven, but that is not necessarily the case. The roller is driven in rotation by way of a belt 107 in the direction indicated by the arrow (FIG. 9) and it moves at a peripheral speed equal to the speed of the main run 90 and thus equal to that of the secondary run 92, to permit a transition of the perpendicular displacement movements, as will be seen hereinafter.

The diversion roller 104 is accompanied by a member 106 which is intended to facilitate the movement of the pallet in a straight line, that is to say along the main path VP, when the diversion roller is in its low position. The member 106 is here formed by another roller which is mounted idly about a vertical axis and which is also displaceable vertically between a low and a high position, but in alternate relationship with the diversion roller 104. When the diversion roller 104 is in the high position to switch the pallet towards the secondary path VS, the roller 106 is in the low position, and vice-versa, when the diversion roller 104 is in the low position, the roller 106 is raised into the high position to facilitate the movement of the pallet on the main path VP.

FIG. 9 shows in broken lines the position of the pallet once engaged on the secondary path VS. The pallet then continues its movement along the paths VP' and VS', turning each time through a right angle at the branching of the paths VS and VP', then at that of the paths VP' and VS' and finally at that of the paths VS' and VP, without a change in its spatial orientation. Rollers similar to the rollers 104 and 106 are provided at the location of each branching.

The path VP' which is parallel to the main path VP is open at the side of the entry edge 93 and at the edge 95 disposed at the opposite side of the module. The result of this configuration is that, when the elementary modules 88 are disposed on the same side of the line of the installation, the pallet can pass directly from one module to the other in a straight line. Rollers 104' and 106' which are similar to the rollers 104 and 106 are disposed at the other branchings of the module for the function of switching the pallet for it to turn through a right angle or for it to continue in a straight line, as has been described hereinbefore.

Reference is now made to FIG. 11 to describe the shape of a guide groove 40 provided in a block 24 of a pallet. The groove comprises a central curved portion 40*a* in the form of a quarter of a circle which is prolonged by two straight end portions 40*b* which are in mutually perpendicular relationship and which are respectively parallel to edges of the pallet. The diversion roller 104, when it is raised into the high position thereof, comes into rolling contact against an external face 41 of the guide groove, that is to say against that which corresponds to the largest radius of the portion in the form of the quarter of a circle.

Thus, upon the change in direction of the pallet, the contact of the roller 104 against the external face 41 of the groove permits transmission of the movement involved as well as a fluid passage through the angle. The distance covered by the roller 104 being greater, that causes the pallet to slow down. During the change in direction of the pallet (transition from the path VP to the path VS), the drive runs 90 and 92 remain moving at a constant speed while the pallet slows down and then accelerates, which permits a transition in the movement thereof without jerks and jolts.

The graph in FIG. 12 illustrates the variations in the linear speed VL of the pallet in dependence on the position of the diversion roller 104 along the guide groove 40. When the roller is being displaced in an end portion 40*b*, the speed VL is constant. Then, when the roller is being displaced in the central portion 40*a*, the speed VL decreases in order then to increase again. When finally the roller is in the other end portion 40*b* the speed is again constant and resumes the same value as previously.

Reference is now made to FIGS. 13 and 14 to describe indexing means for immobilising the pallet. Such indexing means are provided to equip a module having a circulation path of a selected shape, in particular of a straight shape.

The indexing means are capable of immobilising the pallet 10 at a selected location on the circulation path, without the need to alter the speed of the drive run 50.

The indexing means comprise a damper 108 mounted retractably under the action of a jack or ram (not shown) and capable of projecting from the bottom of the module to co-operate with an abutment 110 provided below the lower face of the pallet (FIG. 14). The damper is raised into the high position under the action of a sensor 112 (for example of inductive type) which detects the presence of an idler wheel 26 of the pallet (FIG. 13), which makes it possible for it to co-operate with the abutment 110 to arrest the pallet during displacement thereof.

At the same time the sensor 112 actuates two thrust members 114 capable of applying a lateral force F to two idler wheels 26 of the pallet, on the side opposite to the drive run 50, to cause disengagement of the drive portion of the pallet from the drive run and thus to arrest the pallet in the course of displacement thereof. Preferably the linear speed of the run 50 is not changed.

The thrust members 114 each have a V-shaped ramp 116, here being an asymmetrical V-shape, to ensure centering of the corresponding idler wheel 26. The thrust members 114 are carried by a common support 118 actuated by a jack or ram 120, preferably of pneumatic type. Thus, when the jack or ram is actuated, as from the abutment 108, the ramp 116 of the thrust members laterally displaces the two idler wheels of the pallet and permits the latter to bring its movement to a halt and to be positioned at the desired location, by virtue of the centering effect of the V-shape of the ramps. While the pallet is immobilised the drive run 50 continues to run. During that immobilisation phase, it is possible to carry out an operation, for example an assembly operation or a machining operation, on one or more parts which are carried by the pallet. Once that operation is effected, it is only necessary to displace the thrust members in the opposite direction and to retract the abutment in order to free the pallet, under the effect of the elastic return band, in such a way that it continues its movement by virtue of co-operating with the drive run 50.

It is to be noted that the presence of the damper and the abutment, although optional, contributes to improved indexing of the pallet in conjunction with the two thrust members.

The installation of the invention thus makes it possible to cause pallets to circulate under optimum operating and safety conditions, even at very high speeds. It also permits variations in the speed of one module to another, with immobilisation of the pallets at selected locations in the modules. In the same module, such variations in speed can be achieved with constant linear speeds for the drive members (belts or rollers) which are in contact with the pallet, without slip; likewise, it can be provided that all the drive motors rotate at the same speed in a single module.

For example, the different drive rollers which come into contact with the pallet are of the same diameter. A pallet is arrested by interruption of the frictional engagement against the belt. That thus avoids the latencies which are inherent in variable-speed systems. However the speeds can be different in the different modules of an installation.

What is claimed is:

1. An installation for the circulation of part-carrying pallets of general rectangular shape which are displaced in elementary modules under the frictional action of at least one drive run, displacement of the pallets being effected by way of rolling means provided on the pallet and rolling on the respective bottoms of the modules, characterised in that the pallet comprises a body below which are mounted idler wheels disposed horizontally to provide for guiding and/or driving of the pallet, that each module comprises at least one guide rail defining a circulation path of selected shape and made of an elastically deformable material, and that during the displacement of the pallet on a module the guide rail exercises an elastic return force against at least one idler wheel of the pallet in such a way as to urge at least one drive portion of the pallet into elastic contact against the drive run of the module.

2. An installation as set forth in claim 1 characterised in that the idler wheels are each in the form of a ring mounted on a rolling bearing, in particular on a ball-type rolling bearing, and in the interior of which is accommodated one of the rolling means.

3. An installation as set forth in any one of claims 1 and 2 characterised in that the idler wheels each comprise a cylindrical support surface.

4. An installation as set forth in claim 1 characterised in that the idler wheels are each carried by a block disposed below the body of the pallet.

5. An installation as set forth in claim 1 characterised in that the pallet comprises four idler wheels respectively disposed in the region of the four corners of the pallet and four associated rolling means.

6. An installation as set forth in claim 1 characterised in that the rolling means of the pallet comprise self-steering rollers.

7. An installation as set forth in claim 1 characterised in that the drive run of the module comprise a generally flat and vertical contact face against which the frictional portion of the pallet is capable of coming into elastic contact.

8. An installation as set forth in claim 1 characterised in that the drive run of the module forms part of an endless drive belt.

9. An installation as set forth in claim 1 characterised in that the elastic guide rail is made of an elastic material capable of providing an elastic return action of a selected value.

10. An installation as set forth in claim 9 characterised in that the elastic material is a polyurethane or a rubber.

11. An installation as set forth in claim 1 characterised in that the elastic guide rail is a removable band which is engaged by force in a U-shaped groove which is provided on the module and the opening of which opens substantially in a horizontal direction towards the idler wheels of the pallet.

12. An installation as set forth in claim 11 characterised in that the removable band is of a cross-section of general rectangular shape.

13. An installation as set forth in claim 1 characterised in that the elementary module defines a straight circulation path and comprises a straight drive run and a straight guide rail which are in mutually parallel relationship, that the drive portion of the pallet is formed by a side of the pallet, and that the idler wheel or wheels of the pallet which bear against the straight guide rail is or are disposed in the proximity of an opposite side of the pallet.

14. An installation as set forth in claim 1 characterised in that the elementary module defines a curved circulation path and comprises a curved run and a curved guide rail which are disposed at a constant distance from each other, that the drive portion of the pallet is formed by a first region of at least one idler wheel of the pallet which has a second region in opposite relationship to the first region and which comes into contact against the guide rail in the shape of a circular arc.

15. An installation as set forth in claim 1 characterised in that the elementary module defines a straight main circulation path (VP) having a straight main drive run, a straight secondary circulation path (VS) having a straight secondary drive run, said main path and said secondary path forming a right-angled branching, and that the module is equipped with a diversion roller with a vertical axis, which is displaceable vertically between a low position in which it disappears into the bottom of the module so that the pallet is displaced along the main path (VP) and a high position in which it projects above the bottom of the module to engage into a curved guide groove provided in one of the corners of the pallet in such a way that the pallet leaves the main circulation path (VP), coming out of contact with the main drive run, to engage into the secondary circulation path and to come into contact with the secondary drive run, without a change in the spatial orientation of the pallet.

16. An installation as set forth in claim 15 characterised in that the elementary module comprises a path (VP$^1$) parallel to the main path (VP) which is open at the side of the entry edge of the module and on the edge disposed at the opposite side of the module, in such a way that, when elementary modules are disposed in side-by-side relationship on the same side of the line of the installation, the pallet can pass directly from one module to the other in a straight line.

17. An installation as set forth in any one of claims 15 and 16 characterised in that the pallet comprises four curved guide grooves which are respectively provided in the four angles.

18. An installation as set forth in claim 17 characterised in that the idler wheels are each carried by a block disposed below the body of the pallet and characterised in that the curved guide grooves (40) are respectively provided in the blocks (24) of the pallet.

19. An installation as set forth in claim 15 characterised in that the each of the guide grooves comprises a central portion in the form of a quarter of a circle and prolonged by two straight end portions.

20. An installation as set forth in claim 15 characterised in that the diversion roller is motor-driven in such a way as to have a peripheral speed equal to that of the main drive run and that of the secondary drive run.

21. An installation as set forth in claim 15 characterised in that the diversion roller is accompanied by another member for facilitating the movement in a straight line in the main path (VP), for example another roller which can be raised in alternate relationship with the diversion roller.

22. An installation as set forth in claim 1 characterised in that it comprises indexing means for immobilising the pallet at a selected location on the circulation path, said means comprising two thrust members adapted to be actuated by a sensor to exercise a lateral force on two idler wheels of the pallet on the side opposite to the drive run, cause disengagement of the drive portion of the pallet from the drive run, preferably without changing the linear speed of the latter, and thus arrest the pallet in its displacement.

23. An installation as set forth in claim 22 characterised in that the thrust members each have a V-shaped ramp adapted to ensure centering of the corresponding idler wheel.

24. An installation as set forth in any one of claims 22 and 23 characterised in that the thrust members are actuated by a jack displaceable in a substantially horizontal translatory movement in a direction perpendicular to the displacement of the pallet.

25. An installation as set forth in claim 22 characterised n that the indexing means further comprise a retractable damper adapted to be actuated with the thrust members to cooperate with an abutment of the pallet.

26. A pallet for forming part of an installation as set forth in claim 1.

* * * * *